United States Patent
Shin et al.

(10) Patent No.: US 11,006,167 B2
(45) Date of Patent: May 11, 2021

(54) DISPLAY APPARATUS, METHOD OF CONTROLLING THE SAME, AND RECORDING MEDIUM THEREOF

(71) Applicant: SAMSUNG ELECTRONICS CO., LTD., Suwon-si (KR)

(72) Inventors: Hyunchul Shin, Suwon-si (KR); Hyunjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/661,087

(22) Filed: Oct. 23, 2019

(65) Prior Publication Data

US 2020/0128206 A1 Apr. 23, 2020

(30) Foreign Application Priority Data

Oct. 23, 2018 (KR) .......................... 10-2018-0126482

(51) Int. Cl.
*H04N 5/44* (2011.01)
*H04N 21/422* (2011.01)

(52) U.S. Cl.
CPC . *H04N 21/42204* (2013.01); *H04N 21/42226* (2013.01)

(58) Field of Classification Search
CPC .................. H04N 5/44; H04N 5/4403; H04N 2005/4435; H04N 5/445; H04N 21/431; H04N 21/485
USPC .......................... 348/734, 552; 341/176, 177
See application file for complete search history.

(56) References Cited

U.S. PATENT DOCUMENTS

| 7,626,641 | B1 * | 12/2009 | Beals ..................... G08C 19/28 340/12.28 |
| 9,071,793 | B2 * | 6/2015 | Choi ..................... G08C 17/02 |
| 10,446,020 | B2 * | 10/2019 | Hur ........................ G08C 23/04 |
| 2011/0210849 | A1 * | 9/2011 | Howard ............. G08B 21/0269 340/539.32 |
| 2014/0139749 | A1 | 5/2014 | Kim et al. |
| 2014/0240609 | A1 | 8/2014 | Choi et al. |

(Continued)

FOREIGN PATENT DOCUMENTS

KR    10-2017-0024480 A    3/2017

OTHER PUBLICATIONS

International Search Report (PCT/ISA/210) and Written Opinion (PCT/ISA/237) dated Feb. 20, 2020 issued by the International Searching Authority in International Application No. PCT/KR2019/013909.

*Primary Examiner* — Trang U Tran
(74) *Attorney, Agent, or Firm* — Sughrue Mion, PLLC

(57) ABSTRACT

Disclosed are a display apparatus, a method of controlling the same, and a recording medium thereof, the display apparatus including: a display; an infrared (IR) receiver; first and second interfaces; and a processor configured to: identify a remote-control code set corresponding to an external apparatus connected to the first interface, convert a first key code included in an IR signal of a remote controller into a second key code corresponding to the identified remote-control code set, based on the IR signal received in the IR receiver, transmit a signal including the converted second key code to the external apparatus through the first interface, and control the display to display an image based on a signal received from the external apparatus through the second interface.

20 Claims, 7 Drawing Sheets

(56) References Cited

U.S. PATENT DOCUMENTS

2017/0366778 A1 12/2017 Kim et al.
2018/0131999 A1 5/2018 Han et al.

* cited by examiner

FIG. 5

| SERVICE BUSINESS | Request Cmd Code (TV to SI) | Reply Cmd Code (SI to TV) |
|---|---|---|
| AAA SI VENDOR | 0x00 | 0x01 |
| BBB SI VENDOR | 0x10 | 0x11 |
| CCC SI VENDOR | 0x20 | 0x21 |

FIG. 6

| SERVICE BUSINESS | STB | REMOTE-CONTROL CODE SET |
|---|---|---|
| AAA SI VENDOR | STB 1 | E KEY CODE SET |
| ⋮ | ⋮ | ⋮ |
| CCC SI VENDOR | STB 10 | A KEY CODE SET |
| CCC SI VENDOR | STB 11 | B KEY CODE SET |
| CCC SI VENDOR | STB 12 | C KEY CODE SET |
| CCC SI VENDOR | STB 13 | D KEY CODE SET |

601

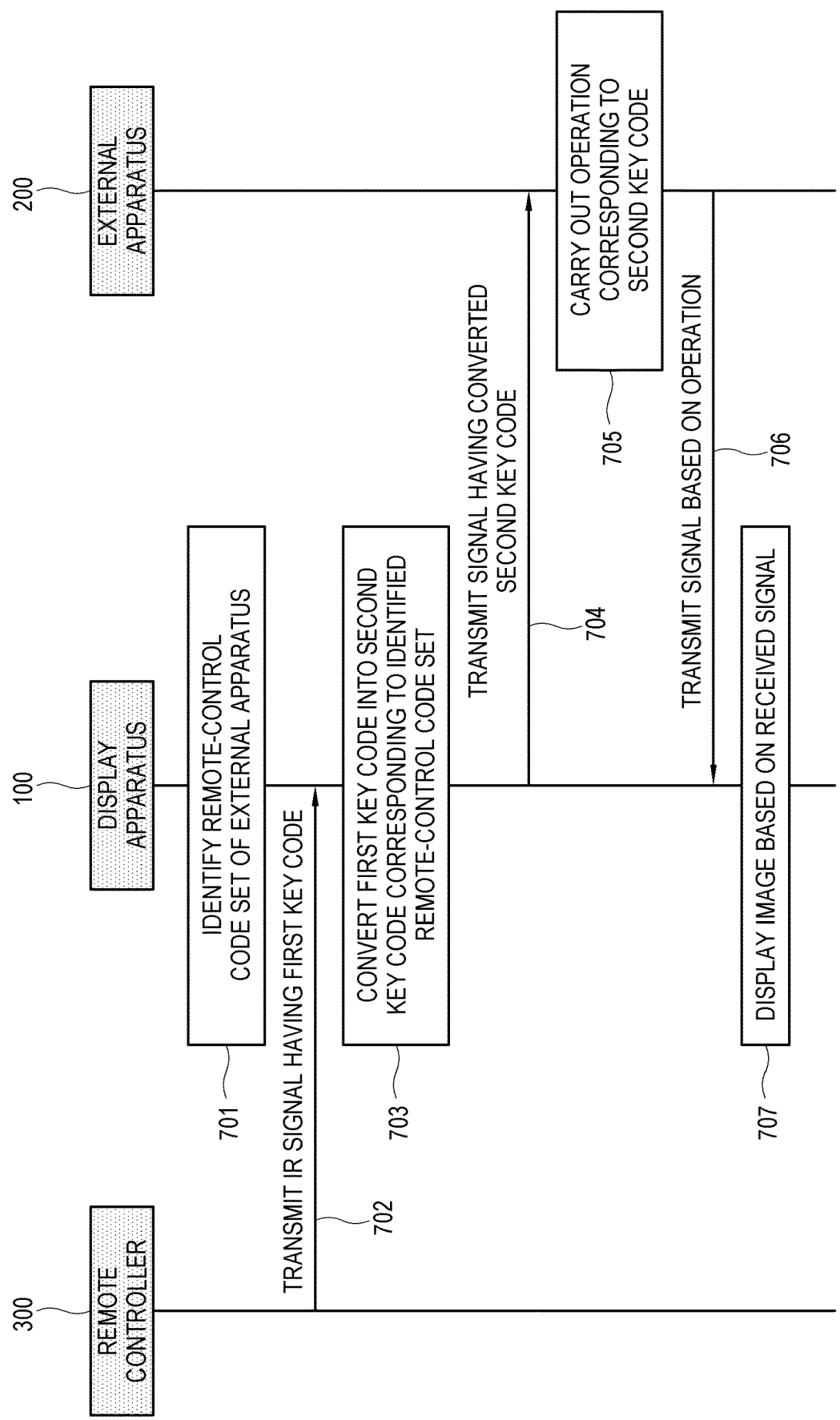

DISPLAY APPARATUS, METHOD OF CONTROLLING THE SAME, AND RECORDING MEDIUM THEREOF

CROSS-REFERENCE TO RELATED THE APPLICATION

This application is based on and claims priority under 35 U.S.C. § 119 to Korean Patent Application No. 10-2018-0126482 filed on Oct. 23, 2018 in the Korean Intellectual Property Office, the disclosure of which is incorporated by reference herein in its entirety.

BACKGROUND

Field

Apparatuses and methods consistent with the exemplary embodiments relate to a display apparatus, a method of controlling the same, and a recording medium thereof, and more particularly to a display apparatus, which delivers an infrared (IR) signal from a remote controller to an external apparatus, a method of controlling the same, and a recording medium thereof.

Description of the Related Art

A display apparatus such as a television (TV), which displays an image based on an image signal received from the outside or generated in itself, is formed as combination of elements classified according to functions with respect to a display on which the image is displayed.

The display apparatus is connectable to various kinds of external apparatuses according to functions desired to be implemented. For example, the display apparatus used in commercial environments such as a hotel, hospital, etc., e.g. a so-called business to business (B2B) TV may receive an image signal from an external apparatus provided by a broadcaster and the like services, and display an image based on the received image signal.

The display apparatus may control the external apparatus by receiving an infrared (IR) signal from a remote controller for receiving a user's input and delivering the IR signal to the external apparatus, so that the external apparatus can provide an image signal in response to the user's input.

However, the remote controller is provided and used as separated from the external apparatus targeted for control, and is thus likely to be lost or stolen.

Therefore, it will be more advantageous for maintenance of a BTB system if not a dedicated remote controller designed for an external apparatus of a certain service but a relatively inexpensive and easily replaceable universal remote controller is used to deliver a signal to the external apparatus.

To use the universal remote controller in controlling the external apparatus, there is a need of transmitting a signal including a code corresponding to a code set for the external apparatus to the external apparatus. Therefore, the display apparatus needs to identify information about specific services.

Further, although the information about the services is identified, it is not easy for a user to personally set a code set exactly matching an external apparatus because the kinds, i.e. models of external apparatuses have been fragmented.

SUMMARY

In accordance with an aspect of the disclosure, a display apparatus includes a display; an infrared (IR) receiver; a first interface and a second interface; and a processor configured to: identify a remote-control code set corresponding to an external apparatus connected to the first interface, based on an IR signal of a remote controller received by the IR receiver, convert a first key code included in the IR signal into a second key code corresponding to the identified remote-control code set, transmit a signal including the second key code to the external apparatus through the first interface, and control the display to display an image based on a signal received from the external apparatus through the second interface.

The processor may be further configured to identify a service provider of the external apparatus, and to identify the remote-control code set from among a plurality of remote-control code sets corresponding to the identified service provider.

The processor may be further configured to: transmit a signal including a preset identification code to the external apparatus through the first interface, and based on a signal including a reply code corresponding to the identification code being received from the external apparatus through the first interface, identify a service provider of the external apparatus corresponding to the identification code.

The apparatus may further include a storage configured to store a plurality of identification codes corresponding to a plurality of service providers and a reply code corresponding to the identification code, and the processor may be further configured to: transmit a plurality of signals including the plurality of identification codes in sequence to the external apparatus through the first interface, and based on a signal including a reply code corresponding to the identification code being received from the external apparatus through the first interface, stop transmitting the plurality of signals including the plurality of identification codes and identify the service provider based on the reply code.

The storage may be further configured to store a remote-control code set corresponding to a type of the external apparatus according to a plurality of service providers, and the processor may be further configured to: extract a remote-control code set corresponding to the identified service provider from the storage, transmit a signal including a predetermined key code selected from the remote-control code set corresponding to the identified service provider to the external apparatus through the first interface, and based on a signal based on an operation corresponding to the transmitted key code being received from the external apparatus through the first interface, identify the remote-control code set corresponding to the external apparatus as the remote-control code set corresponding to the identified service provider.

The processor may be further configured to: extract a plurality of remote-control code sets corresponding to a plurality of types of a plurality of external apparatuses corresponding to the identified service provider, select a key code corresponding to a predetermined function from each of the plurality of remote-control code sets, transmit a plurality of signals including the selected key code in sequence to the external apparatus through the first interface, and based on a signal based on an operation corresponding to the transmitted key code being received from the external apparatus through the first interface, stop transmitting the plurality of signals and identify the remote-control code set corresponding to the external apparatus as a remote-control code set corresponding to the received signal.

The processor may be further configured to execute an initialization mode of the display apparatus, and identify the remote-control code set corresponding to the external apparatus.

The processor may be further configured to enter the initialization mode based on at least one from among a first connection between the display apparatus and the external apparatus, a power supply of the display apparatus, an occurrence of a predetermined event including a user's input, or a periodic interval.

The first interface may include an RJ12 type connector.

The apparatus may further include a storage configured to store code information previously set according to service providers of the external apparatus, a type of external apparatus capable of providing content according to the service providers, and information about a remote-control code set corresponding to each type of external apparatus.

In accordance with an aspect of the disclosure, a method of controlling a display apparatus includes identifying a remote-control code set corresponding to an external apparatus connected to a first interface of the display apparatus; based on an infrared (IR) signal of a remote controller received by an IR receiver, converting a first key code included in the IR signal into a second key code corresponding to the identified remote-control code set; transmitting a signal including the second key code to the external apparatus through the first interface; and displaying an image based on a signal received from the external apparatus through a second interface.

The identifying the remote-control code set may include: identifying a service provider of the external apparatus; and identifying the remote-control code set from among a plurality of remote-control code sets corresponding to the identified service provider.

The method may further include transmitting a signal including a preset identification code to the external apparatus through the first interface, and based on a signal including a reply code corresponding to the identification code being received from the external apparatus through the first interface, identifying a service provider of the external apparatus corresponding to the identification code.

The display apparatus further may include a storage configured to store a plurality of identification codes corresponding to a plurality of service providers and a reply code corresponding to the identification code, and the transmitting the signal including the identification code may include transmitting a plurality of signals including the plurality of identification codes in sequence to the external apparatus through the first interface, and based on a signal including a reply code corresponding to the identification code being received from the external apparatus through the first interface, stopping transmission of the plurality of signals and identifying the service provider corresponding to the reply code.

The storage may be further configured to further store a remote-control code set corresponding to a type of the external apparatus according to a plurality of service providers, and the method further may include: extracting a remote-control code set corresponding to the identified service provider from the storage; transmitting a signal including a predetermined key code selected from the remote-control code set corresponding to the identified service provider to the external apparatus through the first interface; and based on a signal based on an operation corresponding to the transmitted key code being received from the external apparatus through the first interface, identify the remote-control code set corresponding to the external apparatus as the remote-control code set corresponding to the identified service provider.

The method may further include extracting a plurality of remote-control code sets corresponding to a plurality of types of a plurality of external apparatus corresponding to the identified service provider; and selecting a key code corresponding to a predetermined function from each of the plurality of remote-control code sets, and the transmitting the key code may include: transmitting a plurality of signals including the selected key code in sequence to the external apparatus through the first interface, and based on a signal based on an operation corresponding to the transmitted key code being received from the external apparatus through the first interface, stopping transmission of the plurality of signals and identifying the remote-control code set corresponding to the external apparatus as a remote-control code set corresponding to the received signal.

The method may further include executing an initialization mode of the display apparatus, and identifying the remote-control code set corresponding to the external apparatus.

The method may further include entering the initialization mode based on at least one from among a first connection between the display apparatus and the external apparatus, power supply of the display apparatus, an occurrence of a predetermined event including a user's input, or a periodic interval.

The first interface may include an RJ12 type connector.

In accordance with an aspect of the disclosure, a non-transitory computer-readable medium storing a program of a method executable by a processor of a display apparatus, the method includes identifying a remote-control code set corresponding to an external apparatus connected to a first interface of the display apparatus; based on an infrared (IR) signal received in an IR receiver, converting a first key code included in the IR signal into a second key code corresponding to the identified remote-control code set; transmitting a signal including the second key code to the external apparatus through the first interface; and displaying an image based on a signal received from the external apparatus through a second interface.

BRIEF DESCRIPTION OF THE DRAWINGS

The above and/or other aspects will become apparent and more readily appreciated from the following description of exemplary embodiments, taken in conjunction with the accompanying drawings, in which:

FIGS. 5 and 6 are views showing examples of a signal transmitted and received for identifying a code set of a remote controller for an external apparatus according to an embodiment of the disclosure; and FIG. 7 is a flowchart showing a control process of a display apparatus according to an embodiment of the disclosure for delivering an infrared (IR) signal received from a remote controller to an external apparatus.

DETAILED DESCRIPTION OF EXEMPLARY EMBODIMENTS

Figure 1:
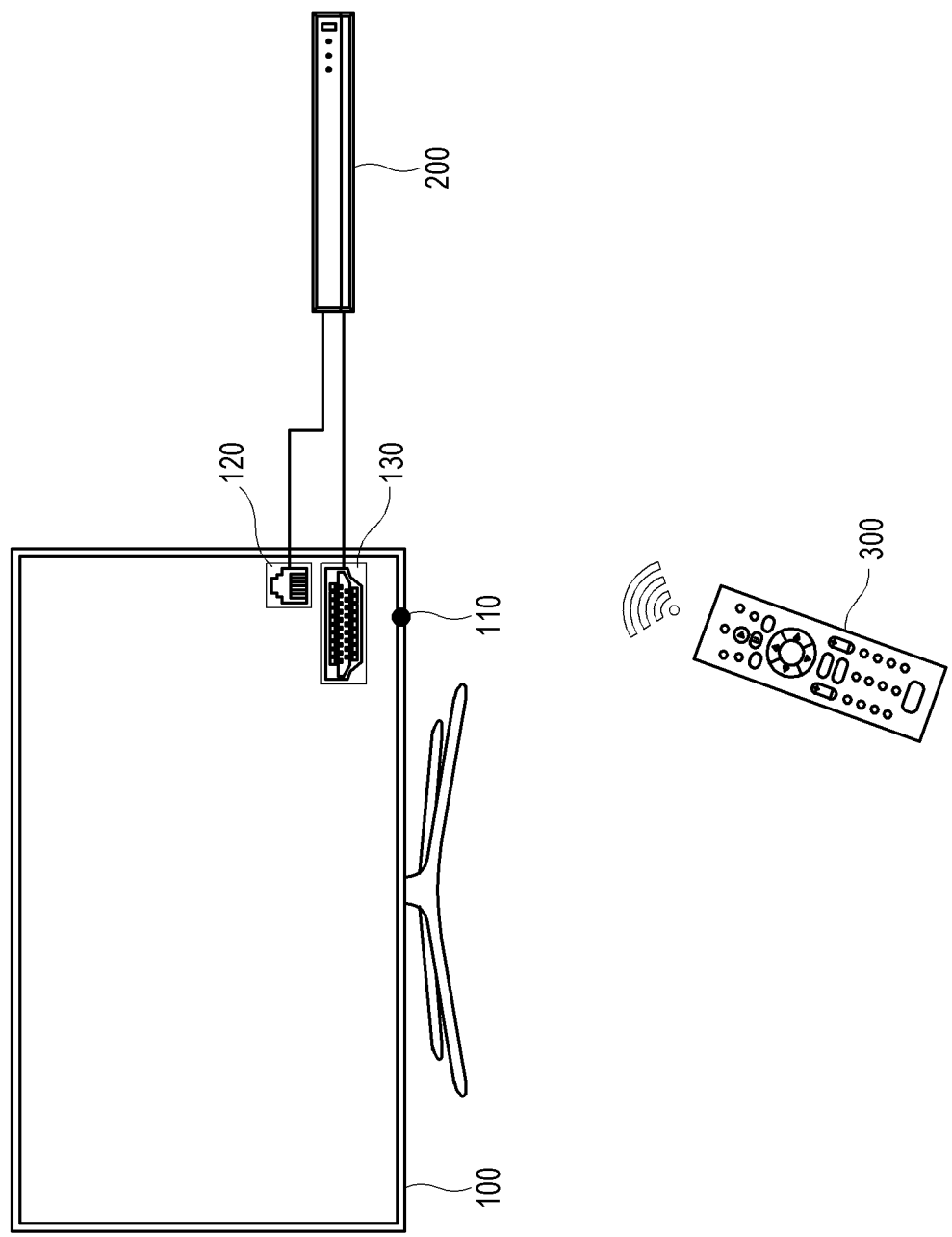
FIG. 1 illustrates an example showing a system including a display apparatus and an external apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present disclosure and the key configurations and functions. In the following descriptions, details about publicly known functions or features will be omitted if it is identified that they cloud the gist of the present disclosure.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

The disclosure provides a display apparatus, a method of controlling the same, and a recording medium thereof, in which the display apparatus used in a commercial environment automatically sets a remote controller according to services and kinds of external apparatus that provides an image signal, so that an easily replaceable and inexpensive remote controller can be conveniently used in controlling the external apparatus.

FIG. 1 illustrates an example showing a system including a display apparatus and an external apparatus according to an embodiment of the disclosure.

As shown in FIG. 1, a display apparatus 100 processes an image signal provided from an external apparatus 200 in accordance with a preset process and displays the processed image signal as an image. The display apparatus 100 includes a television (TV) that processes and displays an image based on at least one among a broadcast signal, broadcast information or a broadcast data provided from a transmitter of a broadcasting station.

According to an embodiment, the display apparatus 100 is actualized as a display apparatus used in commercial environments such as a hotel, hospital, etc., e.g. a so-called business to business (B2B) TV, and receives an image signal from an image source, i.e. The external apparatus 200.

The external apparatus 200 may be actualized as a set-top box (STB) managed or given by a predetermined service provider (e.g. a system integrator (SI). In embodiments, a service provider may be, for example, a service business that provides a service.

However, there are no limits to the kinds of image source that provides content according to the disclosure, and therefore the external apparatus 200 may further include not only the set-top box but also, for example, an optical disc player such as a Blu-ray player or a digital versatile disc (DVD) player; a personal computer (PC) such as a desktop or laptop computer; a game console; a mobile device such as a smartphone, a tablet PC or a smart pad, etc.

When the display apparatus 100 is the TV, the display apparatus 100 may receive and process broadcast content based on at least one of a broadcast signal, broadcast information and broadcast data from a transmitter of a broadcasting station.

The display apparatus 100 may wirelessly receive a radio frequency (RF) signal, i.e. a broadcast signal from the broadcasting station. To this end, the display apparatus 100 may include an antenna configured to receive a broadcast signal, and a tuner configured to be tuned to a channel corresponding to a broadcast signal.

In the display apparatus 100, the broadcast signal may be received through a terrestrial wave, a cable, a satellite, etc. and a signal source is not limited to the external apparatus 200 or the broadcasting station. In other words, any apparatus or station capable of transceiving data may be included in the image source of the disclosure.

Standards for a signal received in the display apparatus 100 may be variously given corresponding to the types of the apparatus, and video content may for example be received based on a high definition multimedia interface (HDMI), a display port (DP), a digital visual interface (DVI), composite video, component video, super video, Syndicat des Constructeurs d'Appareils Radiorécepteurs et Téléviseurs (SCART), universal serial bus (USB), etc. by a wire.

The display apparatus 100 may receive image content from a server or the like through wired or wireless network communication, and there are no limits to the types of communication.

According to an embodiment, the display apparatus 100 may perform at least one of the wireless communication using an access point (AP), or the wireless communication for direct connection with other devices without the AP. For example, the display apparatus 100 may receive content from an image source through wireless network communication such as Wi-Fi, Wi-Fi direct, Bluetooth, Bluetooth low energy, Zigbee, ultrawideband (UWB), near field communication (NFC), etc.

Further, the display apparatus 100 according to an alternative embodiment may receive content through wired network communication such as Ethernet, etc.

According to an embodiment, the display apparatus 100 may serve as an AP via which various peripheral devices such as the smartphone can perform the wireless communication.

The display apparatus 100 may receive content given in the form of a file by streaming in real time through the wired or wireless network.

Further, the display apparatus 100 may perform a signal process to display thereon a moving image, a still image, an application, an on-screen display (OSD), a user interface (UI, hereinafter also referred to as a graphic user interface (GUI)) for various operation controls, etc. based on a signal/data stored in an internal/external storage medium.

According to an embodiment, the display apparatus 100 may operate as a smart TV or Internet protocol (IP) TV. The smart TV refers to a TV that is capable of obtaining and displaying a broadcast signal in real time, has a web browsing function so that various pieces of content can be searched and consumed through the Internet while the broadcast signal is displayed in real time, and provides a convenient user environment for the web browsing function. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, a map, music, a movie, a game, an electronic book, etc.

The display apparatus 100 according to an embodiment of the disclosure receives a signal from a remote controller 300 as shown in FIG. 1.

A signal received from the remote controller 300 includes an infrared (IR) signal having a predetermined frequency band. To this end, the display apparatus 100 may include an IR receiver (see '110' in FIG. 2) to receive the IR signal. There are no limits to an installation position of the IR receiver 110. For example, the IR receiver 110 may be installed at a certain area (e.g. a lower side) of a front edge (i.e. a bezel) of the display apparatus 100 as shown in FIG. 1.

Further, the display apparatus 100 includes first and second interfaces (see '120' and '130' of FIG. 3) through which the external apparatus 200 is connectable by a cable. However, a connection method according to the disclosure between the display apparatus 100 and the external apparatus 200 is not limited to the foregoing embodiments, but may be achieved by the wired or wireless interface based on various standards. Concrete examples of the IR receiver 110, and the first interface 120 and second interface 130 will be described in more detail with reference to FIG. 3.

The display apparatus 100 transmits an IR signal of the remote controller 300 received through the IR receiver 110 to the external apparatus 200 through the first interface 120.

According to an embodiment, the remote controller 300 is actualized by a universal remote controller or integrated remote controller having multi-brand remote (MBR) control functions. According to an alternative embodiment, the remote controller 300 may be provided as a remote controller for the display apparatus 100, i.e. the TV. According to another alternative embodiment, the remote controller 300 may be actualized by a terminal, i.e. a smartphone in which an application for implementing a remote controller function. In other words, there are no limits to the kinds of remote controller 300 according to the disclosure.

As described above, when the remote controller 300 is actualized as the integrated remote controller, the IR signal received from the remote controller 300 may include a predetermined key code corresponding to a standard code set. In other words, a code set of key codes included in the IR signal may be different from the code set of the external apparatus 200, and thus the external apparatus 200 may not identify the key code when the code set is directly delivered.

The display apparatus 100 according to an embodiment of the disclosure converts a first key code included in the IR signal received from the remote controller 300 into a second key code corresponding to the code set of the external apparatus 200, and transmits a signal including the converted second key code to the external apparatus 200 through the first interface 120.

Further, the display apparatus 100 may display an image on a display (see '150' in FIG. 3) based on the signal received from the external apparatus 200 through the second interface 130.

Therefore, it is convenient to control the external apparatus connected through the wired interface without the IR receiver regardless of the kinds of remote controller.

Below, the elements of the display apparatus according to an embodiment of the disclosure will be described with reference to the accompanying drawings.

Figure 2:
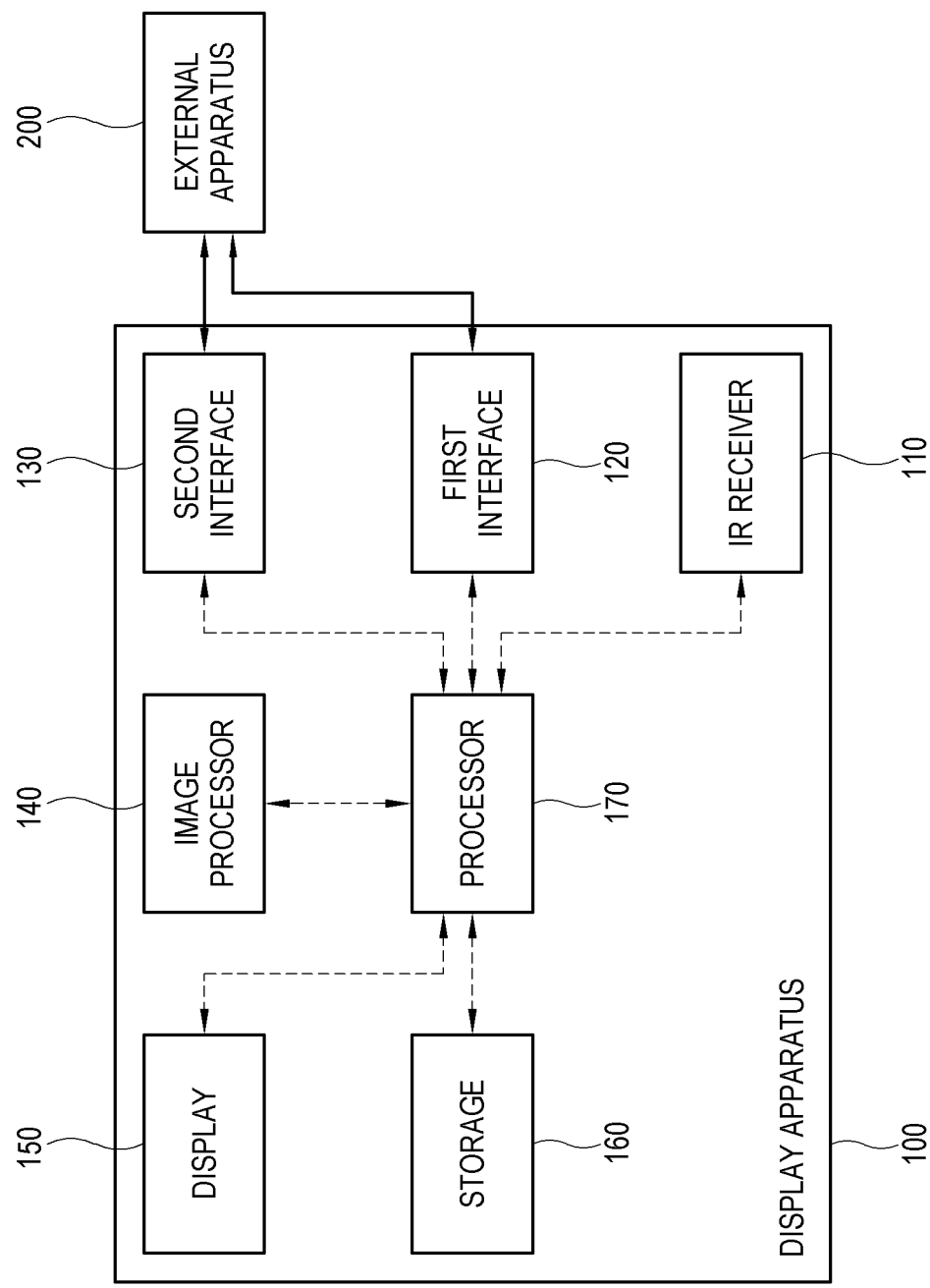
FIG. 2 is a block diagram of a display apparatus according to an embodiment of the disclosure.
Figure 3:
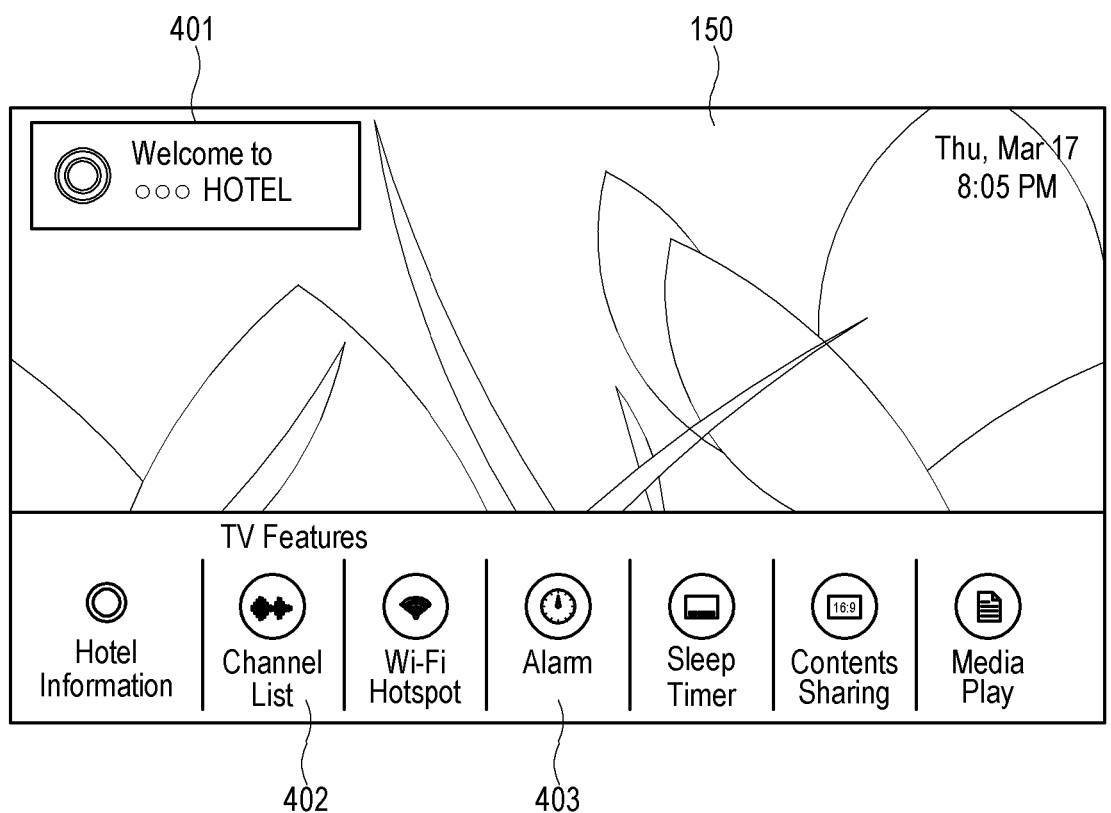
FIG. 3 illustrates an example of a start-up screen of a display apparatus according to an embodiment of the disclosure.

FIG. 2 is a block diagram of a display apparatus according to an embodiment of the disclosure. FIG. 3 illustrates an example of a start-up screen of a display apparatus according to an embodiment of the disclosure.

The display apparatus 100 according to an embodiment of the disclosure, as shown in FIG. 2, includes the IR receiver 110, the first interface 120, the second interface 130, an image processor 140, a display 150, a storage 160, and a processor 170.

The elements included in the display apparatus 100 are not limited to the foregoing embodiment, but may exclude or change some elements or may include other additional elements. For example, the display apparatus 100 may additionally include a communicator including a communication module based on Wi-Fi, Bluetooth, etc. for performing wired or wireless network communication with the image source, the server, etc., or at least one sensor for detecting the surrounding environments of the display apparatus 100.

The IR receiver 110 receives the IR signal output from the remote controller 300. A user may make various inputs such as power on or off, volume control, channel selection, etc. through the remote controller 300.

The IR receiver 110 may be actualized as a communication circuitry configured with at least one electronic device to detect an infrared ray having a predetermined wavelength and generate an electric signal. According to an embodiment, the IR receiver 110 includes an IR photodiode.

The first interface 120 and second interface 130 allow the display apparatus 100 to connect with the external apparatus 200 by a cable.

The first interface 120 transmits a signal to the external apparatus 200, and receives a feedback on the transmitted signal from the external apparatus 200.

The first interface 120 is actualized as a communication circuitry including a data input/output interface in which a communication module (e.g. a S/W module, a chip, etc.), a port, etc. corresponding to a predetermined communication protocol are combined, and may for example include a connector based on an RJ12 type, i.e. an RJ12 port. In other words, the disclosure is applicable to even an external apparatus 200, which has already been connected by a predetermined method, without adding a new interface to the display apparatus 100.

According to an embodiment, the first interface 120 operates as an IR output unit provided to transmit the IR signal received from the remote controller 300 to the external apparatus 200. Thus, the external apparatus 200 without an additional IR receiver can receive a signal from the remote controller 300 and perform operation corresponding to the received signal.

Specifically, in response to the IR signal of the remote controller 300 received through the IR receiver 110, the display apparatus 100 converts the first key code included in the received IR signal into the second key code corresponding to the code set of the remote controller for the external apparatus 200 connected by the first interface 120. The signal including the converted second key code is transmitted to the external apparatus 200 through the first interface 120.

The second interface 130 receives content from the external apparatus 200. The second interface 130 is basically provided to receive a signal from the external apparatus 200, but may be provided to interactively transmit and receive a signal.

The second interface 130 is actualized as a communication circuitry including a data input/output interface in which a communication module (e.g. a S/W module, a chip, etc.), a port, etc. corresponding to a predetermined communication protocol are combined. According to an embodiment, the second interface 130 includes an HDMI or DP port, but communication standards thereof are not limited to the HDMI or the DP.

The image processor 140 performs various preset video/audio processes with regard to the signal of the content received through the second interface 130. The image processor 140 outputs an image signal generated or combined by performing such processes, so that an image based on the image signal can be displayed on the display 150. The image signal processed by the image processor 140 may be based on data stored in the nonvolatile storage 160 such as a flash memory, a hard disk drive, etc.

The image processor 140 includes a decoder configured to decode an image signal to correspond to an image format of the display apparatus 100, and a scaler configured to adjust the image signal to an output resolution of the display 150.

According to an embodiment, the decoder according to an embodiment may for example be actualized by a moving picture experts group (MPEG) decoder, but not limited thereto. In other words, the decoder of the image processor 140 according to an embodiment of the disclosure may be actualized by an H.264 decoder, a high efficiency video codec (HEVC) decoder, or the like decoders based on various compression standards.

There are no limits to the kind of image processing processes performed by the image processor 140 of the disclosure. For example, the image processor 140 of the disclosure may perform at least one of various processes such as de-interlacing for converting an interlaced-type broadcast signal into a progressive-type broadcast signal, noise reduction, detail enhancement, frame refresh rate conversion, and line scanning.

Further, the content processed by the image processor 140 includes a moving image such as a video clip, but also a still image such as a picture having a format of JPEG, a background image, etc.

The image processor 140 may be actualized by a group of individual elements for independently performing such processes, or may be actualized as included in a main system-on-chip (SoC) where many functions are integrated. The main SoC may include at least one micro-processor or central processing unit (CPU) as an example of the processor 170 (to be described later).

According to an embodiment, the image processor 140 may be actualized by a video board where various chipsets, a memory, electronic parts, wiring lines, and the like circuit components for performing such processes are mounted on to a printed circuit board (PCB). In this case, the image processor 140, the storage 160 and the processor 170 of the display apparatus 100 may be provided in a single video board, e.g. a main board. Of course, this is merely an example, and alternatively such elements may be arranged in a plurality of printed circuit boards connectable for communication with each other.

The image signal processed by the image processor 140 is output to the display 150. The display 150 displays an image based on the image signal received from the image processor 140.

The display 150 may be actualized by various display types, for example, liquid crystal, plasma, a light emitting diode, an organic light emitting diode, a surface-conduction electron-emitter, a carbon nano-tube, nano-crystal, etc. without limitations.

According to an embodiment, the display 150 includes a display panel for displaying an image thereon, and may further include an additional element (e.g. a driver) according to the types. The driver includes one or more driver integrated circuits (IC), and outputs an electric signal for driving an electronic device or the like forming a light source or a screen so that an image can be displayed on the display 150 based on the signal received from the image processor 140.

According to an embodiment, when the display apparatus 100 is a B2B TV used in a hotel, the display 150 as shown in FIG. 3 displays an item 401 showing a hotel log and a hotel name as a start-up screen. Further, the start-up screen displayed on the display 150 may additionally display a plurality of menu items 402 and 403 selectable through the remote controller 300.

The storage 160 may be configured to store various pieces of data of the display apparatus 100. The storage 160 may be actualized by a nonvolatile memory (or a writable ROM) which can retain data even though the display apparatus 100 is powered off, and mirror changes. The storage 160 may be provided as at least one among a flash memory, an HDD, electrically programmable ROM (EPROM) or electrically erasable and programmable ROM (EEPROM).

The storage 160 may further include a volatile memory such as a random access memory (RAM), and the volatile memory may include a dynamic RAM (DRAM) or static RAM (SRAM), of which reading or writing speed for the display apparatus 100 is faster than that of the nonvolatile memory.

In the disclosure, a term 'storage' is defined to include not only the nonvolatile memory but also the volatile memory, a cache memory provided in the processor 170, a memory card (e.g. a micro SD card, a memory stick, etc.) mountable to the display apparatus 100 through a connector corresponding to predetermined standards, Data stored in the storage 160 may for example include not only an operating system (OS) for driving the display apparatus 100 but also various software, programs, applications, image data, graphic data, appended data, etc. executable on the OS.

The graphic data is output to the display 150 as an image signal processed by the image processor 140, and may be displayed as graphics such as on-screen display (OSD), a graphic user interface (GUI, hereinafter also referred to as "user interface (UI)"), etc. in a certain area on the screen of the display 150.

According to an embodiment of the disclosure, in the display apparatus 100 actualized as the B2B TV used in a hotel, the item 401 showing the hotel log and the hotel name displayed on the start-up screen of the display 150 as shown in FIG. 3 is given as an example of graphics displayed based on the data of the storage 160.

According to an embodiment, the storage 160 is configured to store information about a remote-control code set code (hereinafter, referred to as a control code set or a code set) according to the kinds, i.e. models of external apparatus 200. Here, the information about the remote-control code set means information about a function performed by the external apparatus 200 in response to an IR signal generated as a user controls each button of the remote controller 300.

A broadcaster or the like service, i.e. an SI may provide content to the display apparatus 100 through the external apparatuses 200 of one or more preset models. For example, a first service may provide content to the display apparatus 100 through the external apparatuses corresponding to the model names "1", "2" and "3", and a second service may provide content to the display apparatus 100 through the external apparatuses corresponding to the model names "4", "5", "6" and "7".

Therefore, according to an embodiment, the information about the remote-control code set stored in the storage 160 includes information about a service that can provide content through the external apparatus 200 matching the corresponding code set.

In other words, the storage 160 may be configured to sort the kinds (or models) of external apparatus, which can provide content, according to the services, and store the information of the remote-control code set corresponding to each of the sorted kinds of external apparatus Further, the storage 160 is configured to additionally store code information preset according to services for managing the external apparatus 200. Here, the code information may include an identification code included in a request packet according to a predetermined protocol transmitted from the display apparatus 100 to the external apparatus 200 so as to identify a service for the external apparatus 200, and a reply code included in a feedback on the request packet.

The processor 170 transmits a request packet including a preset identification code to the external apparatus 200 connected to the first interface 120, and identify a service business for the external apparatus 200 based on the identification code of the request packet and the reply code of the feedback code packet when the feedback packet is received in response to the request packet.

Thus, the display apparatus 100 can identify a remote-control code set even when the code sets are different according to the service businesses. Further, the display apparatus 100 can easily and automatically identify the service business by simple operation of transmitting and receiving a preset code.

The processor 170 extracts the remote-control code set according to the kinds of external apparatus 200 corresponding to the service business identified as above, and transmits the key code selected from the extracted remote-control code set to the external apparatus 200 through the first interface 120. The processor 170 identifies the remote-control code set matching the external apparatus 200 based on the operation of the external apparatus 200 corresponding to the transmitted key code, thereby automatically setting the remote controller.

The processor 170 performs control to operate general elements of the display apparatus 100. The processor 170 executes a control program (or an instruction) for performing such control operations. The processor 170 includes at least one universal processor that loads at least a part of a control program from a nonvolatile memory, in which the control program is installed, to a volatile memory, and executes the loaded control program, and may for example be actualized by a CPU, an application processor (AP), or a microprocessor.

The processor may include a single core, a dual core, a triple core, a quad core, and the like multiple core. The processor may include a plurality of processors, for example, a main processor and a sub processor that operates in a sleep mode (during which only standby power is supplied without operation of the display apparatus). Further, the processor, the ROM, and the RAM may be connected to one another through an internal bus, and the ROM and the RAM belong to the storage 160.

In the disclosure, the processor, as an example of the processor 170, may be actualized as included in the main SoC mounted to the PCB internally provided in the display apparatus 100. Alternatively, the main SoC may further include the image processor 140.

The control program may include a program(s) achieved by at least one of a basic input/output system (BIOS), a device driver, an OS, a firmware, a platform, or an application. According to an exemplary embodiment, the application may be previously installed or stored in the display apparatus 100 when the display apparatus 100 is manufactured, or may be installed in the display apparatus 100 on the basis of application data received from the outside when it is required in the future. The application data may for example be downloaded from an external server such as an application market to the display apparatus 100. Such an external server is merely an example of the computer program product according to the disclosure, but not limited thereto.

According to an embodiment, the operation of the processor 170 may be actualized by a computer program stored in the computer program product (not shown) provided separately from the display apparatus 100. In this case, the computer program product includes a memory in which an instruction corresponding to a computer program is stored, and a processor. The instruction is given to identify a remote controller code set corresponding to an external apparatus connected to the first interface when it is executed by the processor.

Accordingly, the display apparatus 100 downloads and executes the computer program stored in a separate computer program product and performs the operation of the processor 170.

Further, according to an embodiment, the operation of the processor 170 may be carried out by a computer-readable program stored in the recording medium. The program, i.e. data stored in the recording medium may be directly accessed and executed by the processor 170, or downloaded into the display apparatus 100 via a transmission medium actualized by a wired/wireless network in which the computer systems are connected to one another and executed, thereby carrying out operation.

Below, embodiments, in which the display apparatus 100 of the disclosure identifies the remote-control code set matching the external apparatus 200 to set the remote controller and controls the external apparatus 200 based on identification results so that the display apparatus 100 can display an image, will be described with reference to the accompanying drawings.

Figure 4:
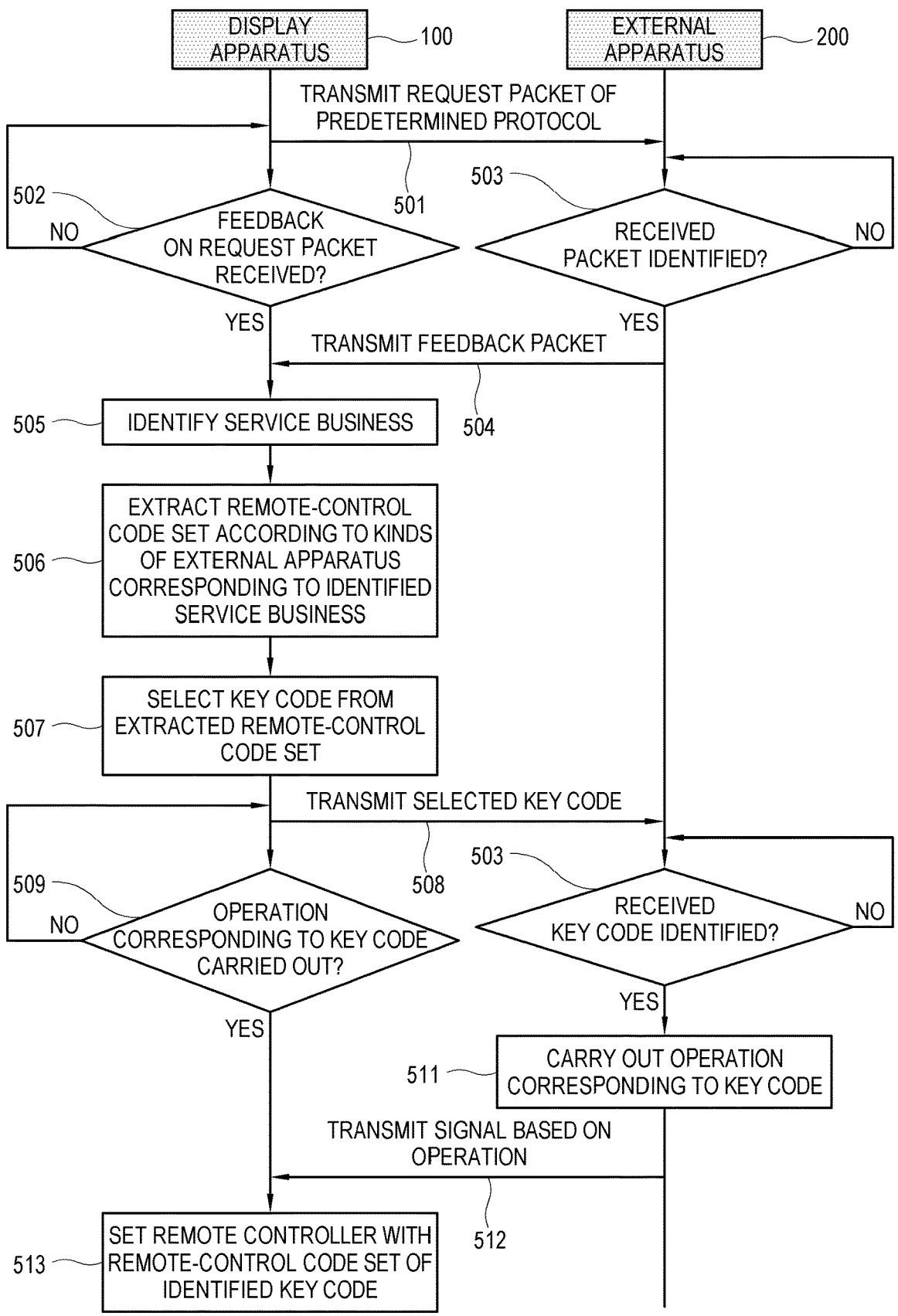
FIG. 4 is a flowchart showing a control process for identifying a code set of a remote controller for an external apparatus in a display apparatus according to an embodiment of the disclosure.

FIG. 4 is a flowchart showing a control process for identifying a code set of a remote controller for an external apparatus in a display apparatus according to an embodiment of the disclosure. FIGS. 5 and 6 are views showing examples of a signal transmitted and received for identifying a code set of a remote controller for an external apparatus according to an embodiment of the disclosure.

According to an embodiment, operation, in which the display apparatus 100 described in FIG. 4 identifies the remote-control code set matching the external apparatus 200 and sets the remote controller, may be performed in an initialization mode of the display apparatus 100 or the external apparatus 200. The display apparatus 100 may enter the initialization mode when the display apparatus 100 and the external apparatus 200 are connected or supplied with power for the first time, when a predetermine event including a user's input occurs, or periodically. A user's input may be made by combination of preset keys in the remote controller 300, and a user includes an administrator. For example, when the apparatus is required to be replaced or reset, the administrator may make the display apparatus 100 enter the initialization mode and identify the remote-control code set matching the external apparatus 200 to thereby set the remote controller. Accordingly, a user can set the remote controller whenever it is required.

As shown in FIG. 4, at operation 501 a request packet having a predetermined protocol is transmitted from the display apparatus 100 to the external apparatus 200.

The processor 170 of the display apparatus 100 transmits a request packet, which includes a preset identification code corresponding to a service business (e.g. an SI) of the external apparatus 200, to the external apparatus 200 through the first interface 120 in the state that the display apparatus 100 and the external apparatus 200 are being connected through the first interface 120.

To this end, the storage 160 is configured to assign and store preset identification codes (e.g. Request Cmd Codes) according to service businesses, i.e. SI vendors of the external apparatuses 200. For example, as shown in FIG. 5, "0x00", "0x01" and "0x20" may be assigned as the identification codes to an AAA SI vendor, a BBB SI vendor, and a CCC SI vendor. Further, the storage 160 is configured to additionally assign and store reply codes (e.g. Reply Cmd Codes) corresponding to the identification codes of the service businesses.

The display apparatus 100 may identify the service business of the external apparatus 200 based on a packet received including a reply code corresponding to the identification code transmitted to the external apparatus 200. To this end, the external apparatus 200 is configured to previously store an identification code of its own service business and information about a reply code corresponding to the identification code.

According to an embodiment, the reply code may be set as a code having a value more increased by '1' than the identification code as shown in FIG. 5, but not limited thereto.

In other words, FIG. 5 shows an example of service businesses and identification and reply codes matching each service business. According to the disclosure, the number and the title of service businesses, and the identification/reply codes of the service businesses may be variously set without limitations.

At operation 501, the processor 170 reads the identification codes according to the service businesses of the external apparatus 200 from the storage 160, and transmits the request packets including the read identification codes in sequence to the external apparatus 200 through the first interface 120.

In response to the request packet transmitted in operation 501, at operation 502 the processor 170 monitors whether a feedback packet is received from the external apparatus 200 through the first interface 120. The processor 170 may transmit the request packets in sequence according to the service businesses until a reply to the request packet, i.e. a feedback packet is received.

Specifically, the processor 170 may for example transmit the request packet, which includes the identification code of "0x00" assigned to the AAA SI vendor, to the external apparatus 200, and wait a reply for a certain period of time.

At operation 503, the external apparatus 200 identifies whether the request packet received in the external apparatus 200 in response to the transmission in operation 501 is identifiable. Here, when the identification code of "0x00" included in the request packet has been stored in the external apparatus 200, the external apparatus 200 can identify the request packet. When the identification code stored in the external apparatus 200 is not "0x00", the external apparatus 200 cannot identify the request packet, and thus ignores the request packet, thereby transmitting no reply to the display apparatus 100.

When a reply to the request packet including the identification code of "0x00" is not received for the certain period of time, the processor 170 transmits a request packet, which for example includes the identification code of "0x10" assigned to the BBB SI vendor, to the external apparatus 200, and then waits a reply for a certain period of time.

In such a manner, the external apparatus 200 identifies the request packet according to whether the identification code of "0x10" included in the request packet has been stored in the external apparatus 200. When the identification code stored in the external apparatus 200 is not "0x10", the external apparatus 200 cannot identify the request packet and thus transmits no reply to the display apparatus 100.

When a reply to the request packet including the identification code of "0x10" is not received for the certain period of time, the processor 170 transmits a request packet, which for example includes the identification code of "0x20" assigned to the CCC SI vendor, to the external apparatus 200, and then waits a reply for a certain period of time.

In such a manner, the external apparatus 200 identifies the request packet according to whether the identification code of "0x20" included in the request packet has been stored in the external apparatus 200. For example, when the identification code stored in the external apparatus 200 is "0x20", the external apparatus 200 identifies the request packet in operation 503.

Further, based on the identification in operation 503, at operation 504 the external apparatus 200 transmits a feedback packet including a reply code of "0x21" to the display apparatus 100.

Based on the monitoring in operation 502, the processor 170 of the display apparatus 100 receives the feedback packet from the external apparatus 200 through the first interface 120 in operation 504. When it is identified that a feedback packet to a predetermined request packet is received, the processor 170 stops transmitting the request packet in operation 501.

At operation 505, processor 170 identifies the reply code of "0x20" in the received feedback packet, and identifies the service business of the external apparatus 200. For example, when the feedback packet including the reply code of "0x21" is received corresponding to the identification code of "0x20", the processor 170 may identify that the service business of the external apparatus 200 is the CCC SI vendor.

At operation 506 processor 170 extracts the remote-control code set according to the kinds of external apparatus 200 corresponding to the service business identified in operation 505.

To this end, the storage 160 is configured to store information about the remote-control code set according to the kinds (e.g. models) of external apparatus to which the service business, i.e. the SI vendor of the external apparatus 200 can provide a broadcast service. For example, as shown in FIG. 6, when there are four kinds of external apparatuses, i.e. set-top boxes (STB) of STB 10, STB 11, STB 12 and STB 13 to which the service business, i.e. the CCC SI vendor can provide the broadcast service, the storage 160 is configured to store an A KEY CODE SET, a B KEY CODE SET, a C KEY CODE SET, and a D KEY CODE SET as information about the remote-control code sets corresponding to the STB 10, the STB 11, the STB 12 and the STB 13, respectively. In FIG. 6, a reference numeral of "601" indicates information about the remote-control code set extracted when the service business identified in operation 505 is the CCC SI vendor.

The storage 160 is configured to sort the kinds (e.g. models) of external apparatus capable of providing content according to the service businesses as described above, and store the information about the remote-control code sets respectively corresponding to the sorted kinds of external apparatus, so that the remote-control code set can be extracted according to the kinds of external apparatus corresponding to the service business of the external apparatus 200 currently connected through the first interface 120 in operation 506.

FIG. 6 illustrates the kinds of external apparatus to which a service business can provide a broadcast service, and remote-control code sets corresponding to the kinds of external apparatus, by way of example. According to the disclosure, the names of the service businesses, the kinds and names of external apparatus, and the corresponding remote-control code sets may be variously set without limitations.

At operation 507, processor 170 selects a key code corresponding to a predetermined function or command from the remote-control code set extracted in operation 506. Specifically, the processor 170 may select a key bode used as a discrimination key (or a sample key) among the remote-control code sets corresponding to the kinds of external apparatus capable of providing a service of the identified service business. Here, the key code selected as the discrimination key may for example include a key code for implementing volume control, channel change, or the like function.

At operation 508 processor 170 transmits a signal, which includes the key code selected as the discrimination key in operation 507, to the external apparatus 200 through the first interface 120.

In operation 508, the processor 170 may sequentially transmit the key codes, i.e. the discrimination keys selected in operation 507 to the external apparatus 200 according to each kind of external apparatuses corresponding to the service business determined in operation 505. With these operations, when the code sets are different according to the service businesses, the display apparatus 100 can identify the remote-control code set by a simple method of using the transmission of the key code.

At operation 509, processor 170 monitors whether operation corresponding to a key code is performed through the first interface 120 from the external apparatus 200, as a reply to the key code transmitted in operation 508.

Specifically, the processor 170 transmits a signal, which for example includes a certain key code selected as a discrimination key from the A KEY CODE SET, i.e. the remote-control code set of the external apparatus STB 10 serviceable by the CCC SI vendor, to the external apparatus 200, and then waits a reply for a certain period of time.

Based on the transmission in operation 508, at operation 510 the external apparatus 200 identifies whether the key code received in the external apparatus 200 is identifiable. Here, when the external apparatus 200 can perform a function corresponding to the received key code, it is identified that the external apparatus 200 can identify the corresponding key code. When the external apparatus 200 cannot identify the corresponding key code, the signal based on the operation corresponding to the key code is not transmitted to the display apparatus 100.

When the reply to the key code selected as the discrimination key from the remote-control code set of the STB 10, i.e. the A KEY CODE SET is not received for the certain period of time, the processor 170 transmits a signal, which for example includes a certain key code selected as the discrimination key from the remote-control code set of another external apparatus STB 11, i.e. the B KEY CODE SET serviceable by the CCC SI vendor, to the external apparatus 200 and then waits a reply for a certain period of time.

In such a manner, the external apparatus 200 identifies whether the received key code is identifiable. When the external apparatus 200 cannot identify the corresponding key code, the signal based on the operation corresponding to the key code is not transmitted to the display apparatus 100.

On the other hand, when the external apparatus 200 can identify the key code, at operation 511 the external apparatus 200 performs operation corresponding to the identified key code. Here, when the key code for example corresponds to a channel change (e.g. '+1'), the external apparatus 200 may perform operation to receive a broadcast signal of a changed channel. Alternatively, when the key code for example corresponds to a volume control (e.g. '−1'), the external apparatus 200 may perform operation to control volume of content being currently received.

At operation 512 external apparatus 200 transmits a signal based on operation in operation 511 to the display apparatus 100. For example, when the key code corresponds to a channel change (e.g. '+1'), a broadcast signal of the changed channel is transmitted to the display apparatus 100 through the second interface 130. Alternatively, when the key code for example corresponds to a volume control (e.g. '−1'), a signal including a command for controlling the volume may be transmitted to the display apparatus 100 through the first interface 120.

Based on the monitoring in operation 509, the processor 170 of the display apparatus 100 may receive the signal from the external apparatus 200 through the first interface 120 or the second interface 130 in operation 512. With regard to a key code selected from a predetermined remote-control code set, the processor 170 stops transmitting the key code in operation 508 when it is identified that the signal based on the operation corresponding to the key code is received.

Further, at operation 513 the processor 170 sets the remote controller of the display apparatus 100 with the remote-control code set of the key code identified by the external apparatus 200 in operation 510, for example, the remote-control code set of the STB 11, i.e. the B KEY CODE SET. Accordingly, the key code included in the IR signal received from the remote controller 300 through the IR receiver 110 is converted corresponding to the remote-control code set set-up in operation 513, for example, the remote-control code set, i.e. the B KEY CODE SET of the STB 11, and transmitted to the external apparatus 200 through the first interface 120.

The display apparatus 100 according to an embodiment of the disclosure identifies the service business by processes of transmitting the identification code to the external apparatus 200 connected to the first interface 120 as described above and checking the reply, and identifies the remote-control code set of the external apparatus 200 by processes of extracting the remote-control code set corresponding to the kind of external apparatus of the service business and checking whether the operation is performed, thereby automatically setting up the remote controller. Accordingly, even when not the remote controller exclusively used for the external apparatus 200 but a universal or integrated remote controller is used, a user does not have to manually set the remote controller. Further, even when the service business or kind (or model) of external apparatus 200 is replaced, the remote controller is set to transmit a signal to the external apparatus 200 without any problems.

FIG. 7 is a flowchart showing a control process of a display apparatus according to an embodiment of the disclosure for delivering an IR signal received from a remote controller to an external apparatus.

As shown in FIG. 7, at operation 701 the display apparatus 100 identifies the remote-control code set of the external apparatus 200 connected to the first interface 120, and sets the remote controller. The identification of the remote-control code set and the setting for the remote controller based on the identification in the operation 701 are equivalent to those described with reference to FIG. 5.

At operation 702, display apparatus 100 receives the IR signal including the first key code from the remote controller 300 through the IR receiver 110. Here, the remote controller 300 outputting the IR signal may be the universal remote controller, and the first key code may have a code value based on the control code set of the universal remote controller.

At operation 709, processor 170 of the display apparatus 100 converts the first key code received in the operation 702 into the second key code corresponding to the remote-control code set for the external apparatus 200 identified in the operation 701. In other words, even when the key code of the IR signal received in the operation 702 is different from the remote-control code set of the external apparatus 200 and not identifiable, the display apparatus 100 converts the received key code into a key code to be identifiable in the external apparatus 200.

At operation 704 processor 170 transmits the signal including the second key code converted in the operation 703 to the external apparatus 200 through the first interface 120.

At operation 705, external apparatus 200 receives the signal including the second key code transmitted in the operation 704, and performs operation corresponding to the second key code. For example, when the second key code corresponds to a channel change (e.g. '+1'), the external apparatus 200 may receive a broadcast signal of a changed channel.

Further, at operation 706 the signal based on the operation in the operation 705 is transmitted from the external apparatus 200 to the display apparatus 100. Here, when the operation in the operation 705 is the channel change, the display apparatus 100 may receive a broadcast signal of the changed channel from the external apparatus 200 through the second interface 130.

At operation 707, processor 170 processes the display 150 to display an image based on the signal received from the external apparatus 200. Here, the processor 170 controls the image processor 140 to perform an image process with regard to the signal received through the second interface 130, and controls the display 150 to display an image based on the processed image signal.

As described above, the display apparatus 100 according to an embodiment of the disclosure converts and transmits the key code included in the IR signal received through the IR receiver 110 into a key code corresponding to the remote-control code set of the external apparatus 200, and it is therefore possible to easily control the external apparatus 200 connected through the wired interface without the IR receiver regardless of the kinds of remote controller 300.

Accordingly, in a hotel and the like B2B TV environments, the dedicated remote controller for the external apparatus 200 is not required and it is easy to provide against the loss or theft of the remote controller, thereby reducing costs of maintenance and offering convenience to a user.

As described above, the display apparatus of the disclosure, the method of controlling the same, and the recording medium thereof are not required to prepare the dedicated remote controller for the external apparatus and are easy to provide against the lost or theft of the remote controller in the hotel and the like commercial environments.

Further, the display apparatus of the disclosure, the method of controlling the same, and the recording medium thereof improve user convenience because the remote controller is set as the service business of the external apparatus and the corresponding key code of the remote controller are automatically identified through signal transmission between the display apparatus and an external apparatus.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. A display apparatus comprising:
   a display;
   an infrared (IR) receiver;
   a first interface and a second interface of a second communication specification; and
   a processor configured to:
      identify a remote-control code set corresponding to an external apparatus connected to the first interface,
      based on an IR signal of a remote controller received by the IR receiver, convert a first key code included in the IR signal into a second key code corresponding to the identified remote-control code set,
      transmit a signal comprising the second key code to the external apparatus through the first interface, and
      control the display to display an image based on a signal received from the external apparatus through the second interface,
   wherein the processor is further configured to:
      transmit a plurality of signals comprising a plurality of identification codes in sequence to the external apparatus through the first interface, and
      based on a signal comprising a reply code corresponding to an identification code being received from the external apparatus through the first interface, stop transmitting the plurality of signals comprising the plurality of identification codes and identify a service provider corresponding to the identification code among a plurality of service providers based on the reply code.

2. The display apparatus of claim 1, wherein the processor is further configured to identify a service provider of the external apparatus among the plurality of service providers, and to identify the remote-control code set from among a plurality of remote-control code sets corresponding to the identified service provider.

3. The display apparatus of claim 1, wherein the processor is further configured to:
   transmit a signal comprising a preset identification code to the external apparatus through the first interface, and based on the signal comprising the reply code corresponding to the identification code being received from the external apparatus through the first interface, identify a service provider of the external apparatus corresponding to the identification code.

4. The display apparatus of claim 3, further comprising a storage configured to store the plurality of identification codes corresponding to the plurality of service providers and the reply code corresponding to the identification code.

5. The display apparatus of claim 4, wherein the storage is further configured to store a remote-control code set corresponding to a type of the external apparatus according to the plurality of service providers, and
wherein the processor is further configured to:
extract a remote-control code set corresponding to the identified service provider from the storage,
transmit a signal comprising a predetermined key code selected from the remote-control code set corresponding to the identified service provider to the external apparatus through the first interface, and
based on a signal based on an operation corresponding to the transmitted key code being received from the external apparatus through the first interface, identify the remote-control code set corresponding to the external apparatus as the remote-control code set corresponding to the identified service provider.

6. The display apparatus of claim 4, wherein the processor is further configured to:
extract a plurality of remote-control code sets corresponding to a plurality of types of a plurality of external apparatuses corresponding to the identified service provider,
select a key code corresponding to a predetermined function from each of the plurality of remote-control code sets,
transmit a plurality of signals comprising the selected key code in sequence to the external apparatus through the first interface, and
based on a signal based on an operation corresponding to the transmitted key code being received from the external apparatus through the first interface, stop transmitting the plurality of signals and identify the remote-control code set corresponding to the external apparatus as a remote-control code set corresponding to the received signal.

7. The display apparatus of claim 1, wherein the processor is further configured to execute an initialization mode of the display apparatus, and identify the remote-control code set corresponding to the external apparatus.

8. The display apparatus of claim 7, wherein the processor is further configured to enter the initialization mode based on at least one from among a first connection between the display apparatus and the external apparatus, a power supply of the display apparatus, an occurrence of a predetermined event including a user's input, or a periodic interval.

9. The display apparatus of claim 1, wherein the first interface comprises an RJ12 type connector.

10. The display apparatus of claim 1, further comprising a storage configured to store code information previously set according to service providers of the external apparatus, a type of external apparatus capable of providing content according to the service providers, and information about a remote-control code set corresponding to each type of external apparatus.

11. A method of controlling a display apparatus, comprising:
identifying a remote-control code set corresponding to an external apparatus connected to a first interface of the display apparatus;
based on an infrared (IR) signal of a remote controller received by an IR receiver of the display apparatus, converting a first key code included in the IR signal into a second key code corresponding to the identified remote-control code set;
transmitting a signal comprising the second key code to the external apparatus through the first interface; and
displaying an image based on a signal received from the external apparatus through a second interface of the display apparatus;
transmitting a plurality of signals comprising a plurality of identification codes in sequence to the external apparatus through the first interface, and
based on a signal comprising a reply code corresponding to an identification code being received from the external apparatus through the first interface, stopping transmission of the plurality of signals comprising the plurality of identification codes and identifying a service provider corresponding to the identification code among a plurality of service providers based on the reply code.

12. The method of claim 11, wherein the identifying the remote-control code set comprises:
identifying a service provider of the external apparatus among the plurality of service providers; and
identifying the remote-control code set from among a plurality of remote-control code sets corresponding to the identified service provider.

13. The method of claim 11, further comprising:
transmitting a signal comprising the identification code to the external apparatus through the first interface, and
based on the signal comprising the reply code corresponding to the identification code being received from the external apparatus through the first interface, identifying a service provider of the external apparatus corresponding to the identification code.

14. The method of claim 11, further comprising executing an initialization mode of the display apparatus, and identifying the remote-control code set corresponding to the external apparatus.

15. The method of claim 14, further comprising entering the initialization mode based on at least one from among a first connection between the display apparatus and the external apparatus, power supply of the display apparatus, an occurrence of a predetermined event including a user's input, or a periodic interval.

16. The method of claim 11, wherein the first interface comprises an RJ12 type connector.

17. A method of controlling a display apparatus, comprising:
identifying a remote-control code set corresponding to an external apparatus connected to a first interface of the display apparatus;
based on an infrared (IR) signal of a remote controller received by an IR receiver, converting a first key code included in the IR signal into a second key code corresponding to the identified remote-control code set;
transmitting a signal comprising the second key code to the external apparatus through the first interface;
displaying an image based on a signal received from the external apparatus through a second interface;
transmitting a signal comprising a preset identification code to the external apparatus through the first interface; and based on a signal comprising a reply code corresponding to the identification code being received from the external apparatus through the first interface, identifying a service provider of the external apparatus corresponding to the identification code, wherein the display apparatus further comprises a storage configured to store a plurality of identification codes corresponding to a plurality of service providers and the reply code corresponding to the identification code, and wherein the transmitting the signal comprising the identification code comprises:
transmitting a plurality of signals comprising the plurality of identification codes in sequence to the external apparatus through the first interface, and
based on the signal comprising the reply code corresponding to the identification code being received from the external apparatus through the first interface, stopping transmission of the plurality of signals and identifying the service provider corresponding to the reply code.

18. The method of claim 17, wherein the storage is further configured to store a remote-control code set corresponding to a type of the external apparatus according to the plurality of service providers, and wherein the method further comprises:
extracting a remote-control code set corresponding to the identified service provider from the storage;
transmitting a signal comprising a predetermined key code selected from the remote-control code set corresponding to the identified service provider to the external apparatus through the first interface; and
based on a signal based on an operation corresponding to the transmitted key code being received from the external apparatus through the first interface, identify the remote-control code set corresponding to the external apparatus as the remote-control code set corresponding to the identified service provider.

19. The method of claim 17, further comprising:
extracting a plurality of remote-control code sets corresponding to a plurality of types of a plurality of external apparatus corresponding to the identified service provider; and selecting a key code corresponding to a predetermined function from each of the plurality of remote-control code sets, and wherein the transmitting the key code comprises:
transmitting a plurality of signals comprising the selected key code in sequence to the external apparatus through the first interface, and
based on a signal based on an operation corresponding to the transmitted key code being received from the external apparatus through the first interface, stopping transmission of the plurality of signals and identifying the remote-control code set corresponding to the external apparatus as a remote-control code set corresponding to the received signal.

20. A non-transitory computer-readable medium storing a program of a method executable by a processor of a display apparatus, the method comprising:
identifying a remote-control code set corresponding to an external apparatus connected to a first interface of the display apparatus
based on an infrared (IR) signal received in an IR receiver of the display apparatus, converting a first key code included in the IR signal into a second key code corresponding to the identified remote-control code set;
transmitting a signal comprising the second key code to the external apparatus through the first interface; and
displaying an image based on a signal received from the external apparatus through a second interface of the display apparatus, wherein the transmitting the signal comprising the identification code comprising:
transmitting a plurality of signals comprising a plurality of identification codes in sequence to the external apparatus through the first interface, and
based on a signal comprising a reply code corresponding to the identification code being received from the external apparatus through the first interface, stopping transmission of the plurality of signals comprising the plurality of identification codes and identifying a service provider corresponding to the identification code among a plurality of service providers based on the reply code.

* * * * *